United States Patent [19]

Van Manen

[11] 4,409,163

[45] Oct. 11, 1983

[54] METHOD FOR MOLDING A COMPOSITE FOAMED RESIN PULL STRAP

[75] Inventor: Dick T. Van Manen, Canandaigua, N.Y.

[73] Assignee: Voplex Corporation, Pittsford, N.Y.

[21] Appl. No.: 211,431

[22] Filed: Nov. 28, 1980

[51] Int. Cl.³ .............................................. B29D 27/04
[52] U.S. Cl. ................... 264/45.5; 264/46.4; 264/46.7; 264/156; 264/162; 264/273
[58] Field of Search ..................... 264/45.5, 46.7, 46.4, 264/46.6, 156, 162, 273

[56] References Cited

U.S. PATENT DOCUMENTS

| | | | |
|---|---|---|---|
| 3,446,880 | 5/1969 | Enicks | 264/46.7 X |
| 3,493,449 | 2/1970 | Krug | 264/46.4 X |
| 3,594,836 | 7/1971 | Robertson | 264/46.6 X |
| 3,596,381 | 8/1971 | Fukuoka | 264/45.5 X |
| 3,658,971 | 4/1972 | Schickedanz | 264/45.5 X |
| 3,929,948 | 12/1975 | Welch et al. | 264/45.5 |
| 3,952,383 | 4/1976 | Moore et al. | 24/265 R |
| 3,977,054 | 8/1976 | Moore et al. | 24/265 R |
| 4,130,976 | 12/1978 | Kesseler et al. | 264/45.5 X |
| 4,152,798 | 5/1979 | Akaura et al. | 264/45.5 X |
| 4,174,988 | 11/1979 | Moore et al. | 156/213 |

Primary Examiner—Philip E. Anderson
Attorney, Agent, or Firm—Stonebraker, Shepard & Stephens

[57] ABSTRACT

A pull strap handle meeting all the standards of the automotive industry is formed economically with molding operations. The handle is formed with a strip 15 of strong resilient material with high tensile strength that serves as a support element. Support element 15 is enclosed within a molded cover having a firm outer side 17 and a soft inner side 18. Soft side 18 is molded of foamed resin material directly onto support element 15 to form a secure bond. Firm side 17 can be molded in a single operation with soft side 18 or can be molded separately, attached to support element 15, and located in a cavity mold that forms soft side 18. The cover can also be molded to support element 15 within a cavity mold that forms both cover sides 17 and 18 or the cover can be extruded onto support element 15 in a continuous operation.

10 Claims, 6 Drawing Figures

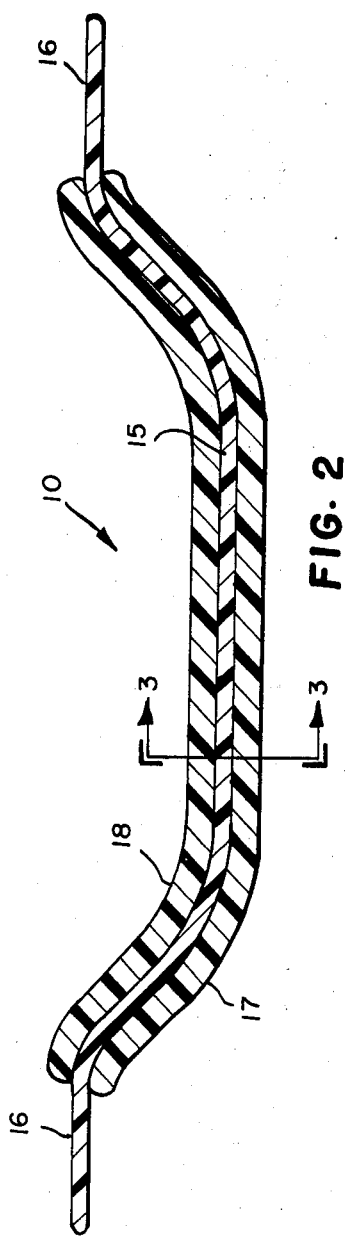
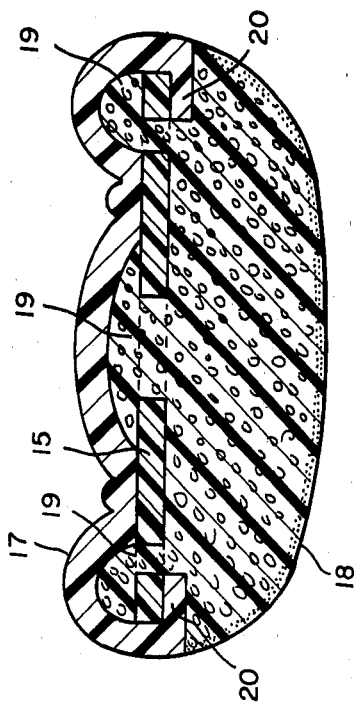
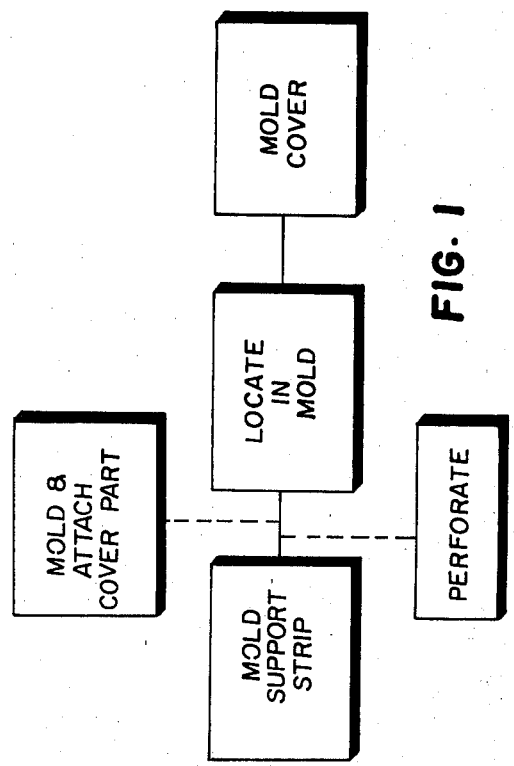

METHOD FOR MOLDING A COMPOSITE FOAMED RESIN PULL STRAP

BACKGROUND

This invention applies to pull straps for the interior of automobiles and trucks. These include pull straps for closing doors and assist straps on door frames or seat backs to provide hand holds for people entering and leaving vehicles.

Automotive pull straps must meet high standards of strength, durability, and appearance. This has previously required resilient steel support elements providing the necessary tensile strength and an assembly of padding, surfacing, and seaming elements wrapped around the support strip and secured together with dielectric heating. The result simulates a padded leather wrapping stitched in place, but the preferred materials for present pull strap covers are resinous.

Style also requires that pull straps have a firm side facing the automotive interior and a soft side that the user's fingers engage. Present construction of pull strap handles is shown in U.S. Pat. Nos. 3,952,383; 3,977,054; and 4,174,988.

My invention provides a pull strap meeting all strength, quality, and appearance requirements and formed more economically with molding operations, rather than assembly operations. My invention aims at a pull strap handle that is competitive in every respect, including lower cost from faster and more efficient manufacture using less labor and fewer separate components.

SUMMARY

My invention changes the materials involved and devises ways of meeting the pull strap handle requirements with molded, rather than assembled, structure. My pull strap handle uses a strip of molded resilient resin material having a high tensile strength and serving as a support element enclosed within a molded cover. The cover has a firm side and a soft side securely united with the support element, and at least the soft side is molded directly onto the support element. The firm side of the cover can be molded separately, attached to the support element, and located in a cavity mold that forms the soft side of the cover. The cover can also be formed of a single resin bonded to the support element in a cavity mold shaped to provide firm and soft sides for the cover. In addition, the cover can be molded as an extrusion continuously joined to the support element.

DRAWINGS

FIG. 1 is a schematic diagram of steps used in molding pull strap handles according to my invention;

FIG. 2 is a longitudinal cross-sectional view of a preferred embodiment of a molded pull strap handle according to my invention;

FIG. 3 is an enlarged cross-sectional view of the handle of FIG. 2 taken along the line 3—3 thereof.

DETAILED DESCRIPTION

Figure 4:
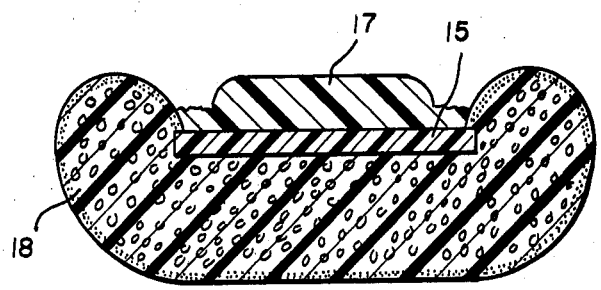
FIGS. 4–6 are enlarged cross-sectional views similar to the view of FIG. 3 and showing alternative preferred embodiments of my invention.

Pull strap and assist strap handles can have many shapes and dimensions. They can be made in straight lengths that are bent into a desired curvature when mounted; and they can be preformed into required shapes such as loops, curves, or the shape shown in FIG. 2. My invention accommodates all of these by using molds that form whatever shapes are required.

I prefer a resinous support element 15 in place of the usual resilient steel strip, and I form strip 15 by extrusion or injection molding of an elastomeric polyester or polyamide material. This gives strip 15 both resilience and high tensile strength.

I then form a molded cover over the central length of strip 15, preferably leaving ends 16 uncovered for ready attachment to a vehicle. The cover has a firm outer side 17 and a soft inner side 18, and these can be molded in a single operation or formed separately and combined with strip 15 to form a secure union integrating the cover and strip together. Several preferred ways of accomplishing this are shown in FIGS. 3–6.

In the embodiment of FIG. 3, strip 15 is extruded, cut in lengths, and perforated to form openings 19 or is injection molded with the proper dimensions and perforations. The firm side 17 of the molded cover is extruded or injection molded of a suitable resin material such as a thermoplastic polyurethane. It is configured to form whatever decorative style is required. Cover side 17 also is formed with in-turned edges 20 that grip the edges of strip 15 so that cover part 17 can be temporarily attached to strip 15.

Then strip 15 with attached cover part 17 is located in a mold cavity shaped to form soft cover part 18 of a foamed resin material such as a self-skinning polyurethane foam. Reaction injection molding or mechanical mixing in a closed mold process using a mold cavity can form cover part 18 as a foamed resin material securely bonded to strip 15 and cover part 17 and extending through perforation openings 19. Use of a self-skinning foamed resin material also forms a dense outer surface that makes cover part 18 durable.

Not only are components 15, 17, and 18 all economically formed by molding, but machines can readily attach cover part 17 to support element 15 and position this assembly within a mold cavity where the cover is completed by molding soft part 18. The resulting pull strap 10 is similar in appearance to previous pull straps and meets all the industry requirements while being made more efficiently at lower cost.

The embodiment of FIG. 4 uses an extruded resin support strip 15 cut to length from an extrusion and an extruded cover firm side 17 cut to a shorter length and secured to strip 15 by adhesive or dielectric welding. Strips 15 and 17 can also be cut to the same length and can be formed and joined together in a continuous operation at low cost.

Lengths of support element 15 and firm cover side 17 are then located within a mold cavity where the soft part 18 of the rest of the cover is formed with a self-skinning resin foam. The resin of soft part 18 bonds securely to strip 15 and extends to the edge of cover part 17 for an attractive and complete covering of strip 15.

Figure 5:
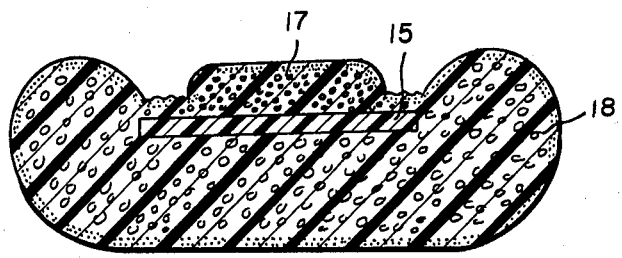

In the embodiment of FIG. 5, both the firm cover part 17 and the soft cover part 18 are formed of self-skinning foamed resin secured to support element 15 in a single molding operation. Besides the different configurations forming firm side 17 and soft side 18, coatings can be applied to the mold surface to control surface skinning and texture.

Figure 6:
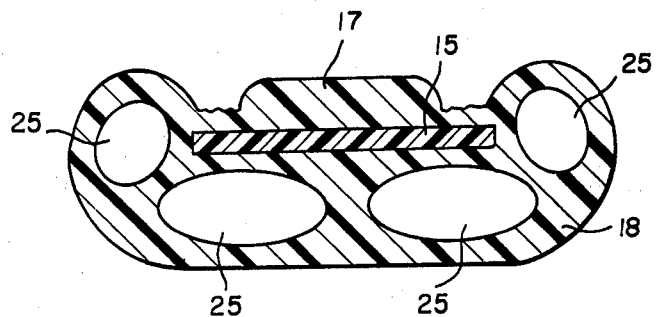

In the embodiment of FIG. 6, the complete cover is formed as an extrusion enclosing support element 15.

The firmness of cover portion 17 is insured by using solid resin material secured directly against a face of strip 15, while the softness of cover portion 18 is insured by forming hollow regions 25. Surface texture can be formed on the cover extrusion after the material leaves the extrusion die, and texturing is especially effective where most desired in the firm part 17 of the extruded cover.

Many different resins, molding techniques, mold coatings, and surface-texturing operations are possible in practicing the invention. Also, mold pull strap handles can be formed in many longitudinal and cross-sectional shapes to meet style requirements.

I claim:

1. A method of molding a pull strap handle having a strong and resilient support element formed as a flat, thin strip with two face sides, a region of said element between the ends of said element being enclosed within a cover formed to provide a firm side on one face side of said element and a soft side on an opposite face side of said element, said molding method comprising:
  a. molding said firm side of said cover of a resin material;
  b. attaching said firm side of said cover to said one face side of said support element;
  c. locating said support element and said attached firm side of said cover in a mold from which the free ends of said support element extend, said mold having a cavity arranged adjacent said opposite face side of said element; and
  d. forming said soft side of said cover of a self-skinning foamed resin material molded to the shape of said cavity and bonded to said support element and said firm side of said cover.

2. The molding method of claim 1 including perforating said support element and molding said soft side of said cover to penetrate said perforations.

3. The molding method of claim 1 including forming said firm side of said cover with inturned edges that wrap around and attach to said support element.

4. The molding method of claim 1 including forming said firm side of said cover with a flat face and bonding said flat face of said firm side of said cover to said one face side of said support element.

5. The molding method of claim 1 including molding said support element of a high tensile strength resin material.

6. A method of molding a pull strap handle having a strong and resilient support element formed as a flat, thin strip with two face sides, a region of said element between the ends of said element being enclosed within a cover formed to provide a firm side on one face side of said element and a soft side on an opposite face side of said element, said molding method comprising:
  a. locating said support element in a mold from which the free ends of said support element extend, said mold having a cavity surrounding said support element and having a firm side molding region adjacent said one face side of said support element and a soft side molding region adjacent said opposite face side of said element; and
  b. foaming a self-skinning resin material within said mold cavity to extend entirely around said support element and form said firm side of said cover as relatively thin within said firm side molding region and form said soft side of said cover as relatively thick within said soft side molding region.

7. The method of claim 6 including molding said support element of a high tensile strength resin material.

8. A method of molding a pull strap handle having a strong and resilient support element formed as a flat, thin strip with two face sides, a region of said element between the ends of said element being enclosed within a cover formed to provide a firm side on one face side of said element and a soft side on an opposite face side of said element, said molding method comprising:
  a. forming an indefinite length of said support element strip;
  b. extruding said cover in an indefinite length to surround said indefinite length strip;
  c. making said firm side of said extruded cover relatively thin and extending only a short distance from said one face side of said support element and making said soft side of said cover relatively thick and extending farther from said opposite face side of said support element; and
  d. forming hollow interior regions in said soft side of said cover, said hollow regions being arranged between said support element and the exterior of said soft side of said cover and said hollow regions being large enough to make said soft side of said cover adequately soft.

9. The method of claim 8 including molding said support element of a high tensile strength resin material.

10. The method of claim 8 including texturing the exterior surface of said firm side of said cover promptly after extruding said cover.

* * * * *